US012599927B2

(12) United States Patent
Park

(10) Patent No.: US 12,599,927 B2
(45) Date of Patent: Apr. 14, 2026

(54) ELECTRODE SLURRY-SUPPLYING APPARATUS, COATING, APPARATUS, AND DIE COATER

(71) Applicant: LG Energy Solution, Ltd., Seoul (KR)

(72) Inventor: Jun Sun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 465 days.

(21) Appl. No.: 18/271,341

(22) PCT Filed: Oct. 31, 2022

(86) PCT No.: PCT/KR2022/016809
§ 371 (c)(1),
(2) Date: Jul. 7, 2023

(87) PCT Pub. No.: WO2023/085671
PCT Pub. Date: May 19, 2023

(65) Prior Publication Data
US 2024/0058838 A1 Feb. 22, 2024

(30) Foreign Application Priority Data
Nov. 9, 2021 (KR) ........................ 10-2021-0153054

(51) Int. Cl.
*B05C 11/10* (2006.01)
*B05C 5/02* (2006.01)
*H01M 4/04* (2006.01)
(52) U.S. Cl.
CPC ........ *B05C 11/1044* (2013.01); *B05C 5/0254* (2013.01); *H01M 4/0404* (2013.01)

(58) Field of Classification Search
CPC ...... H01M 4/0404; H01M 4/04; H01M 10/04; B05C 5/0254; B05C 11/1044;
(Continued)

(56) References Cited

U.S. PATENT DOCUMENTS

2006/0251965 A1 11/2006 Nagayama et al.
2020/0406498 A1 12/2020 Niimi et al.

FOREIGN PATENT DOCUMENTS

CN 209849206 U 12/2019
CN 213923190 U 8/2021
(Continued)

OTHER PUBLICATIONS

Machine translation of CN214600126U (Year: 2021).*
(Continued)

*Primary Examiner* — Vishal I Patel
(74) *Attorney, Agent, or Firm* — Lerner David LLP

(57) ABSTRACT

The present specification relates to an electrode slurry providing device, a coating device, and a die coater. The electrode slurry providing device may include a tank configured to accommodate electrode slurry therein, a main pipe having one end connected to the tank at a discharge location, and two or more branch pipes configured to discharge the electrode slurry from the main pipe. Each branch pipe may be connected to the main pipe at a respective junction, each junction may be located at a horizontal distance away from the discharge location and at a vertical drop below the discharge location, and the vertical drop of each junction may become greater as the horizontal distance of the junction from the discharge location becomes greater.

7 Claims, 3 Drawing Sheets

(58) Field of Classification Search
CPC ....... B05C 11/10; B05C 5/02; B05C 11/1002;
B05C 11/1036
See application file for complete search history.

(56)                References Cited

FOREIGN PATENT DOCUMENTS

| CN | 214600126 | U | 11/2021 |
|----|-----------|---|---------|
| EP | 4325625 | A1 | 2/2024 |
| JP | H09017423 | A | 1/1997 |
| JP | H1119566 | A | 1/1999 |
| JP | 200742386 | A | 2/2007 |
| JP | 4431858 | B2 | 3/2010 |
| JP | 2014188436 | A | 10/2014 |
| JP | 201621328 | A | 2/2016 |
| JP | 201750213 | A | 3/2017 |
| JP | 2017228421 | A | 12/2017 |
| JP | 2018041616 | A | 3/2018 |
| KR | 20040057652 | A | 7/2004 |
| KR | 100850179 | B1 | 8/2008 |
| KR | 101023155 | B1 | 3/2011 |
| KR | 20130122909 | A | 11/2013 |
| KR | 102026691 | B1 | 10/2019 |
| KR | 102035822 | B1 | 11/2019 |
| KR | 20200035642 | A | 4/2020 |
| KR | 20200054991 | A | 5/2020 |
| WO | 2006047588 | A2 | 5/2006 |

OTHER PUBLICATIONS

Machine translation of JPH1119566A (Year: 1999).*
Extended European Search Report including Written Opinion for Application No. 22893093.9, dated Jun. 25, 2024, pp. 1-8.
International Search Report for PCT/KR2022/016809 mailed Feb. 27, 2023. 3 pages.

* cited by examiner

[FIG. 1]
<u>1</u>
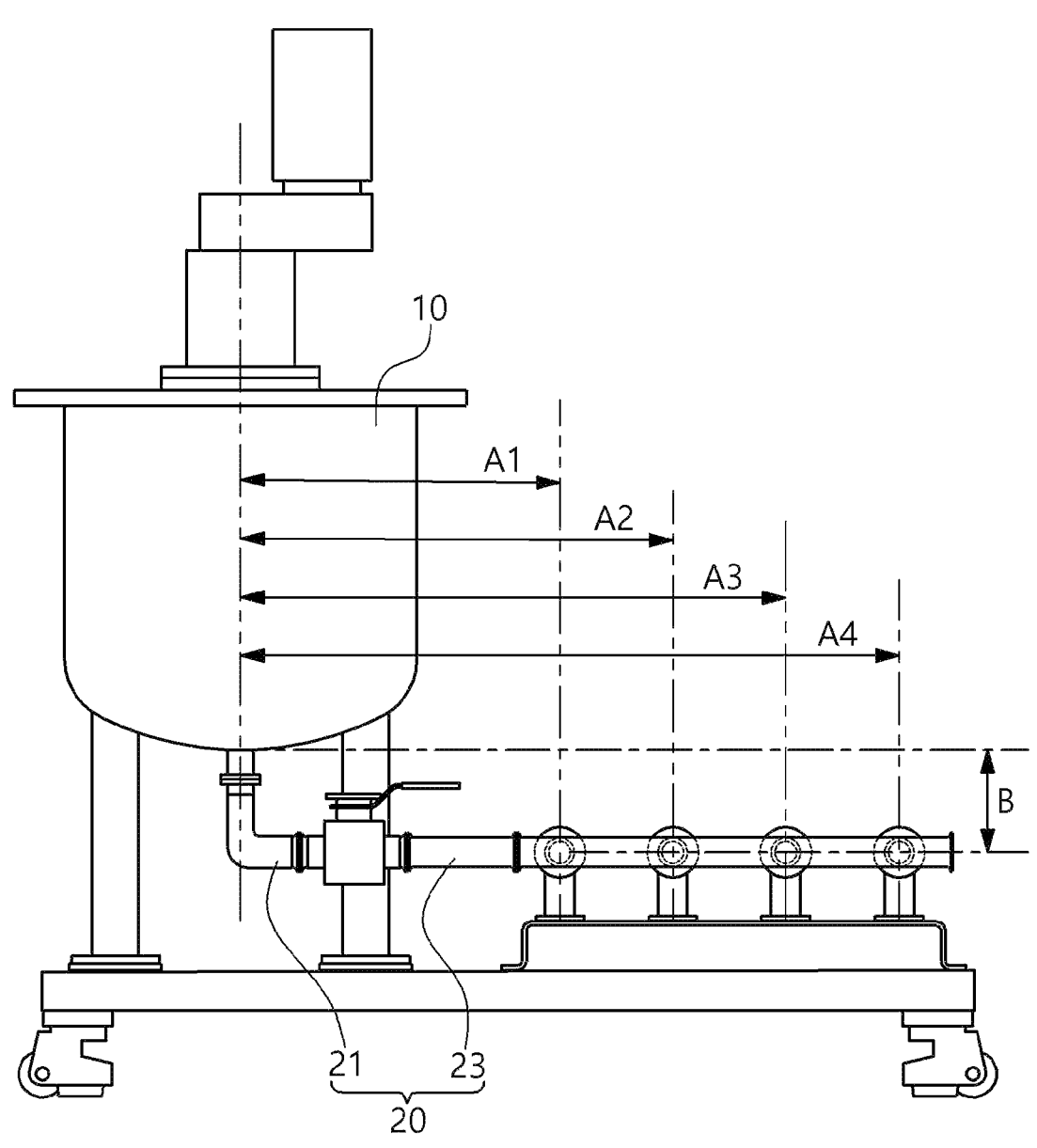

[FIG. 3]
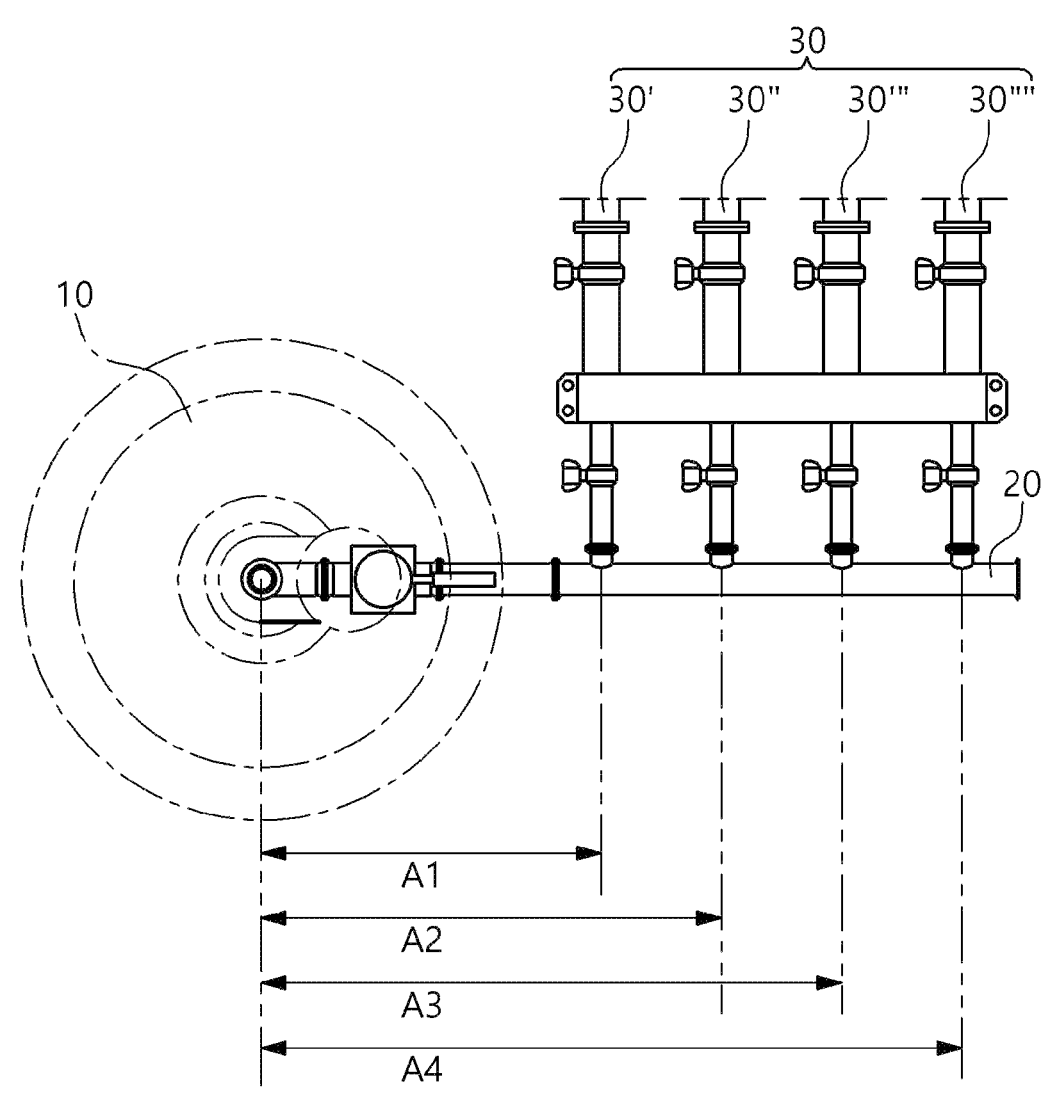

ELECTRODE SLURRY-SUPPLYING APPARATUS, COATING, APPARATUS, AND DIE COATER

CROSS-REFERENCE TO RELATED APPLICATIONS

This application is a national stage entry under 35 U.S.C. § 371 of International Application No. PCT/KR2022/016809, filed on Oct. 31, 2022, which claims priority to Korean Patent Application No. 10-2021-0153054, filed on Nov. 9, 2021, the disclosures of which are hereby incorporated herein by reference in their entireties.

TECHNICAL FIELD

The present specification relates to an electrode slurry providing device, a coating device, and a die coater.

BACKGROUND ART

Recently, prices of energy sources have been raised because of the depletion of fossil fuels, and the interest in environmental pollution is increasing. Therefore, there is an increasing demand for environmental-friendly alternative energy sources. Therefore, research on various power production technologies such as nuclear power, solar power, wind power, and tidal power is being continuously conducted. In addition, interest in power storage devices for more efficiently using the produced energy is high.

In particular, as the development of technologies and demands for mobile devices are increased, there is a rapidly increasing demand for batteries as energy sources. Many studies are being conducted on the batteries in order to meet these needs.

Representatively, regarding a shape of the battery, there is a high demand for an angular or pouch-type secondary battery that may have a small thickness and be applied to products such as mobile phones. Regarding a material, there is a high demand for lithium secondary batteries such as lithium-ion batteries or lithium-ion polymer batteries that have advantages such as a high energy density, a discharge voltage, and output stability.

In general, the secondary battery is structured to include an electrode assembly made by stacking a positive electrode, a negative electrode, and a separator positioned between the positive electrode and the negative electrode. The positive and negative electrodes are each manufactured by applying electrode slurry containing an active material onto a current collector.

To apply the electrode slurry, the electrode slurry is provided through a plurality of lines branching off from a tank that stores the electrode slurry, and the coating is performed for each line.

In this case, there is a need for studies to supply the electrode slurry at a uniform flow rate for each line.

DETAILED DESCRIPTION OF THE INVENTION

Technical Problem

An object of the present specification is to provide an electrode slurry providing device, a coating device, and a die coater.

Technical Solution

An embodiment of the present specification provides an electrode slurry providing device including: a tank configured to accommodate electrode slurry; a main pipe having one end connected to the tank; and two or more branch pipes configured to discharge the electrode slurry introduced from the main pipe, in which a point at which the branch pipe and the main pipe are connected to each other is gradually lowered as the point at which the branch pipe and the main pipe are connected to each other becomes distant from the tank.

In the embodiment of the present specification, the electrode slurry providing device may include two or more pumps positioned at the point at which the branch pipe and the main pipe are connected to each other.

In the embodiment of the present specification, a ratio of a distance A between the point at which the branch pipe and the main pipe are connected to each other and one end of the main pipe connected to the tank on a plane perpendicular to a gravitational direction to a height difference B between the point at which the branch pipe and the main pipe are connected to each other and one end of the main pipe connected to the tank in the gravitational direction may be 2:1 to 3:1.

In the embodiment of the present specification, the main pipe may include: a connection pipe connected to the tank; and a straight pipe coupled to the connection pipe and connected to the two or more branch pipes.

In the embodiment of the present specification, an angle defined between a plane perpendicular to a gravitational direction and a central axis of the straight pipe may be 5 degrees or more and 25 degrees or less.

Another embodiment of the present invention provides a coating device or a die coater configured to discharge the electrode slurry provided from the electrode slurry providing device.

Advantageous Effects

The electrode slurry providing device according to the present specification may supply the electrode slurry from the single electrode slurry tank to the plurality of branch pipes at a uniform flow rate regardless of physical properties of the electrode slurry.

The electrode slurry providing device according to the present specification may increase the number of branch pipes for each tank.

BRIEF DESCRIPTION OF DRAWINGS

FIG. 1 is a cross-sectional view of an electrode slurry providing device in the related art.

FIG. 2 is a cross-sectional view of an electrode slurry providing device according to the present specification.

FIG. 3 is a bottom plan view of the electrode slurry providing device according to the present specification.

EXPLANATION OF REFERENCE NUMERALS AND SYMBOLS

1: Electrode slurry providing device
10: Tank
20: Main pipe
21: Connection pipe
23: Straight pipe
30: Branch pipe
30': First branch pipe
30": Second branch pipe
30''': Third branch pipe
30'''': Fourth branch pipe

BEST MODE

Hereinafter, the present invention will be described in detail with reference to the drawings. However, the drawings are intended to illustratively describe the present invention, and the scope of the present invention is not limited by the drawings.

Figure 2:
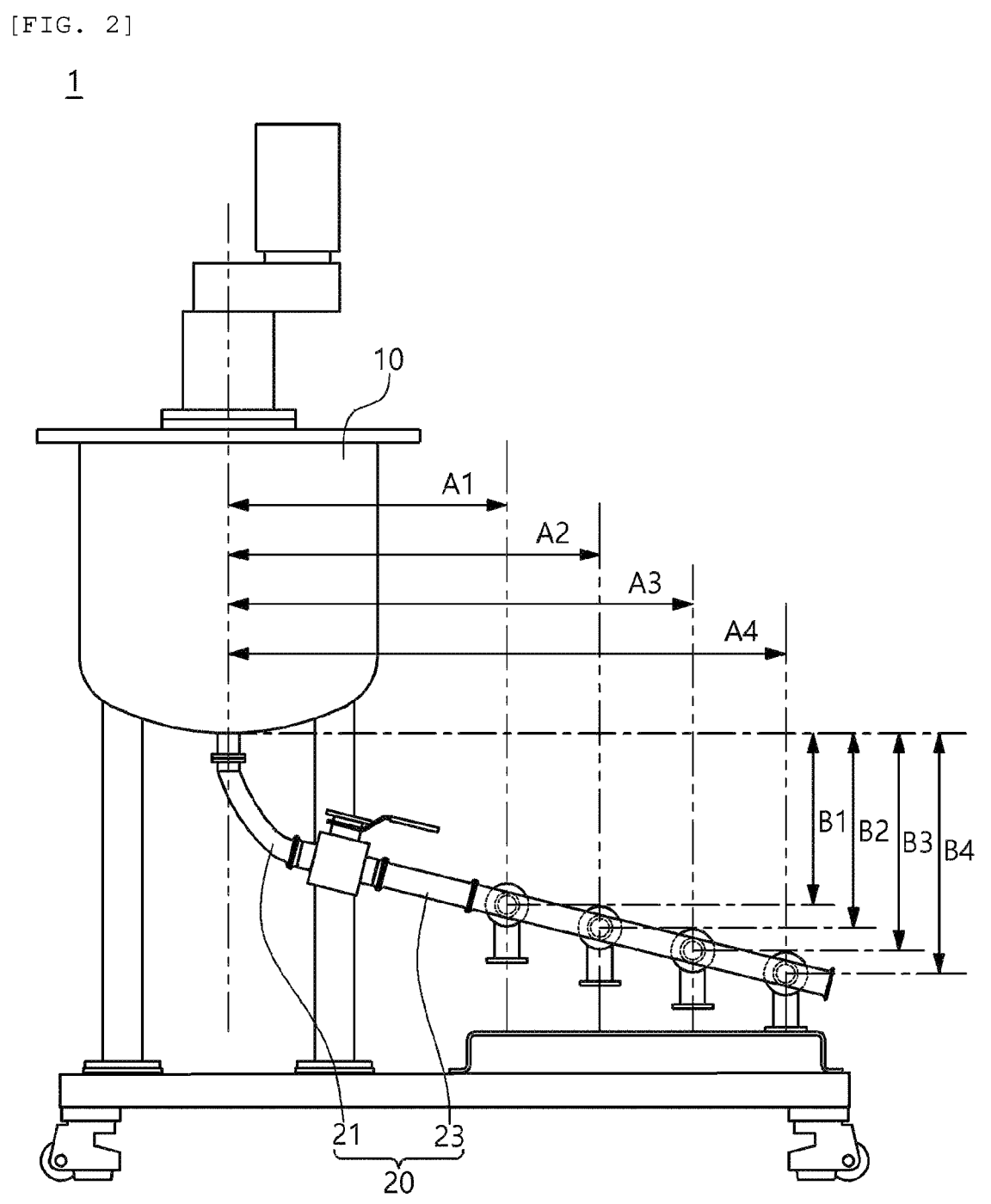

FIG. 2 is a cross-sectional view of an electrode slurry providing device 1 according to the present specification, and FIG. 3 is a bottom plan view of the electrode slurry providing device 1 according to the present specification. The electrode slurry providing device 1 includes a tank 10, a main pipe 20, and branch pipes 30.

During an electrode slurry coating process, the tank 10, which supplies electrode slurry to a coating device, discharges the electrode slurry through the single main pipe 20. The main pipe 20 supplies the electrode slurry, which is discharged from the tank 10, to the coating device (not illustrated) through the plurality of branch pipes 30 independently connected to the pump (not illustrated). In this case, the type of coating device is not particularly limited as long as the coating device may apply the electrode slurry. For example, the coating device may be a comma coater, a spin coater, or a slot die coater.

In this case, the tank 10, the main pipe 20, and the branch pipe 30 of the electrode slurry providing device 1 may each be made of a metallic material having predetermined rigidity. Any material may be applied as long as the material may withstand pressure generated by a supply of the electrode slurry.

The shape of the tank 10 is not limited as long as the tank 10 may store the electrode slurry. The tank 10 may have a cylindrical shape. A bottom surface of the tank 10 may have a convex shape so that the electrode slurry stored in the tank may be efficiently used. The electrode slurry stored in the tank may be discharged to the main pipe 20 through a discharge port provided at the lowest position of the convex shape.

As illustrated in FIG. 1, in the electrode slurry providing device 1 in the related art, the main pipe 20 connected to the tank 10 is disposed in parallel with the ground surface, and heights of the branch pipes are equal to one another. For this reason, there is a problem in that the flow rates of the electrode slurry discharged through the branch pipes are different from one another. Specifically, the flow rate of the electrode slurry discharged from the branch pipe positioned relatively close to the tank is high, and the flow rate of the electrode slurry discharged from the branch pipe positioned relatively distant from the tank is low. In addition, in case that a viscosity of the electrode slurry is too low or high, the electrode slurry cannot even be discharged from the branch pipe positioned distant from the tank. This situation becomes worse as the amount of electrode slurry in the tank decreases.

In contrast, as illustrated in FIG. 2, in the electrode slurry providing device 1 according to the present specification, the main pipe 20 connected to the tank 10 is disposed obliquely so that one end of the main pipe 20 is positioned higher than the other end of the main pipe 20. The flow rate of the electrode slurry may be uniformized so that the electrode slurry is discharged uniformly from the branch pipes 30.

The main pipe 20 may be inclined obliquely while defining an acute angle with respect to a horizontal surface. In this case, the gradient of the main pipe 20 may be changed in consideration of the type of electrode slurry, the viscosity, and the like. For example, the gradient may be adjusted to be 5 degrees or more and 25 degrees or less, particularly, 10 degrees or more and 20 degrees or less.

The main pipe 20 may include a connection pipe 21 connected to the tank 10, and a straight pipe 23 coupled to the connection pipe 21 and connected to the two or more branch pipes 30. In this case, an angle defined between a plane perpendicular to the gravitational direction and a central axis of the straight pipe 23 may be adjusted to be 5 degrees or more and 25 degrees or less, particularly, 10 degrees or more and 20 degrees or less.

One end of the main pipe 20 is connected to the tank 10, and a lateral portion of the main pipe 20 is connected to at least one branch pipe 30. The electrode slurry discharged from the tank 10 is moved to the branch pipe 30, i.e., the electrode slurry discharged from the tank 10 is moved to a pump (not illustrated) separately provided in the branch pipe 30 only by the head of the electrode slurry, i.e., the pressure according to the height. Because the main pipe 20 is disposed obliquely, the electrode slurry discharged from the tank may be transferred to the pump (not illustrated) separately provided in the branch pipe 30 only by the head of the electrode slurry, i.e., the pressure according to the height. Therefore, it is possible to transfer the electrode slurry at a uniform flow rate to the respective branch pipes 30.

There are also level differences in heights between the pumps (not illustrated) positioned at connection points between the main pipe 20 and the branch pipes 30, such that the electrode slurry may be discharged at the same flow rate from the respective branch pipes 30 regardless of physical properties of the electrode slurry.

The head of the electrode slurry, i.e., the pressure according to the height, which allows the electrode slurry discharged from the tank to move to the pump (not illustrated) separately provided in the branch pipe 30, may be adjusted on the basis of a ratio of a distance A between a point at which the branch pipe and the main pipe are connected to each other and one end of the main pipe connected to the tank on the plane perpendicular to the gravitational direction to a height difference B between the point at which the branch pipe and the main pipe are connected to each other and one end of the main pipe connected to the tank in the gravitational direction.

First, a ratio A:B in the electrode slurry providing device in the related art will be described with reference to FIG. 1. Because all the branch pipes have the same height, B is constant, A1:B is 4:1, A2:B is 5:1, A3:B is 6:1, and A4:B is 7:1.

In contrast, in the electrode slurry providing device 1 according to the present specification, the ratio of the distance A between the point at which the branch pipe and the main pipe are connected to each other and one end of the main pipe connected to the tank on the plane perpendicular to the gravitational direction to the height difference B between the point at which the branch pipe and the main pipe are connected to each other and one end of the main pipe connected to the tank in the gravitational direction is adjusted to be 2:1 to 3:1.

Referring to the ratio A:B in the electrode slurry providing device 1 according to the present specification illustrated in FIG. 2, A1:B1, A2:B2, A3:B3, and A4:B4 are 2:1 to 3:1, respectively.

The ratio A1:B1 is a ratio of a distance A1 between a point at which the first branch pipe 30' and the main pipe 20 are connected to each other and one end of the main pipe 20 connected to the tank 10 on the plane perpendicular to the gravitational direction to a height difference B1 between the point at which the first branch pipe 30' and the main pipe 20 are connected to each other and one end of the main pipe 20 connected to the tank 10 in the gravitational direction.

The ratio A2:B2 is a ratio of a distance A2 between a point at which the second branch pipe 30" and the main pipe 20 are connected to each other and one end of the main pipe 20 connected to the tank 10 on the plane perpendicular to the gravitational direction to a height difference B2 between the point at which the second branch pipe 30" and the main pipe 20 are connected to each other and one end of the main pipe 20 connected to the tank 10 in the gravitational direction.

The ratio A3:B3 is a ratio of a distance A3 between a point at which the third branch pipe 30''' and the main pipe 20 are connected to each other and one end of the main pipe 20 connected to the tank 10 on the plane perpendicular to the gravitational direction to a height difference B3 between the point at which the third branch pipe 30''' and the main pipe 20 are connected to each other and one end of the main pipe 20 connected to the tank 10 in the gravitational direction.

The ratio A4:B4 is a ratio of a distance A4 between a point at which the fourth branch pipe 30"" and the main pipe 20 are connected to each other and one end of the main pipe 20 connected to the tank 10 on the plane perpendicular to the gravitational direction to a height difference B4 between the point at which the fourth branch pipe 30"" and the main pipe 20 are connected to each other and one end of the main pipe 20 connected to the tank 10 in the gravitational direction.

At least one of the branch pipes 30 may be connected to the lateral portion of the main pipe 20. Specifically, the number of branch pipes 30 may be 2 or more, 3 or more, or 2 or more and 10 or less. In comparison with the related art, the electrode slurry may be supplied at a uniform flow rate regardless of the physical properties of the electrode slurry. Therefore, the number of branch pipes, through which the electrode slurry may be supplied at a uniform flow rate from the single tank, increases in comparison with the related art.

Another embodiment of the present invention provides a coating device configured to discharge the electrode slurry provided from the electrode slurry providing device. The type and shape of the coating device are not particularly limited as long as the coating device may coat the substrate with the electrode slurry by discharging the electrode slurry provided from the electrode slurry providing device. For example, the coating device may be a comma coater, a spin coater, a slot die coater, or the like.

In this case, the coating device may be connected to each of the branch pipes of the electrode slurry providing device, and the coating devices respectively connected to the branch pipes are identical to or different from one another.

Still another embodiment of the present invention provides a die coater configured to discharge the electrode slurry provided from the electrode slurry providing device.

The die coater includes two or more dies, and a shim disposed between the dies and configured to discharge the electrode slurry.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims rather than the detailed description, and it should be interpreted that the meaning and scope of the claims and various embodiments derived from the equivalent concepts thereto fall within the scope of the present invention.

The invention claimed is:

1. An electrode slurry providing device comprising:
   a tank configured to accommodate electrode slurry therein;
   a main pipe having one end connected to the tank at a discharge location; and
   two or more branch pipes configured to discharge the electrode slurry from the main pipe,
   wherein each branch pipe is connected to the main pipe at a respective junction, each junction being located at a horizontal distance away from the discharge location and at a vertical drop below the discharge location, and the vertical drop of each junction becomes greater as the horizontal distance of the junction from the discharge location becomes greater.

2. The electrode slurry providing device of claim 1, further comprising two or more pumps respectively positioned at the junctions of the two or more branch pipes.

3. The electrode slurry providing device of claim 1, wherein a ratio of the horizontal distance to the vertical drop of each junction from the discharge location is 2:1 to 3:1, the vertical drop being in a gravitational direction from the discharge location, the horizontal distance being in a direction perpendicular to the gravitation direction.

4. The electrode slurry providing device of claim 1, wherein the main pipe comprises a connection pipe connected to the tank; and a straight pipe coupled to the connection pipe and connected to the two or more branch pipes.

5. The electrode slurry providing device of claim 4, wherein an angle defined between a direction perpendicular to a gravitational direction and a longitudinal axis of the straight pipe is from 5 to 25 degrees.

6. A coating device configured to discharge electrode slurry from the electrode slurry providing device of claim 1.

7. A die coater configured to discharge electrode slurry from the electrode slurry providing device of claim 1.

* * * * *